Figure 4:
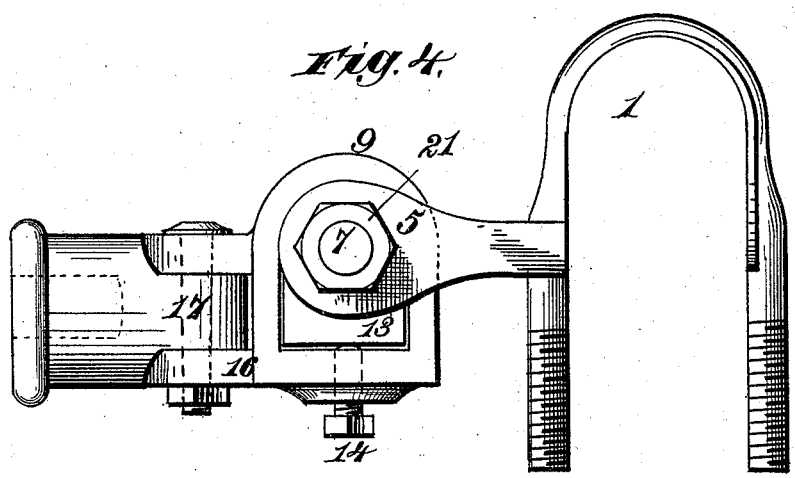

(No Model.) 2 Sheets—Sheet 1.
H. TEMPLE.
THILL COUPLING.
No. 305,642. Patented Sept. 23, 1884.
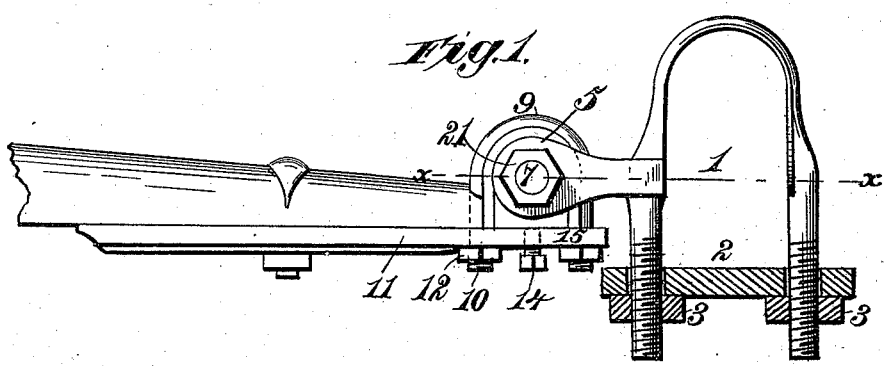
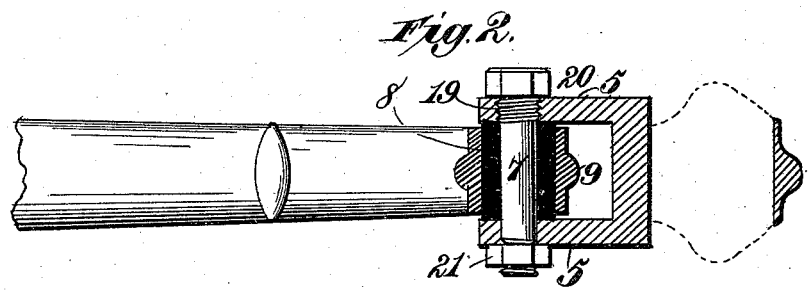
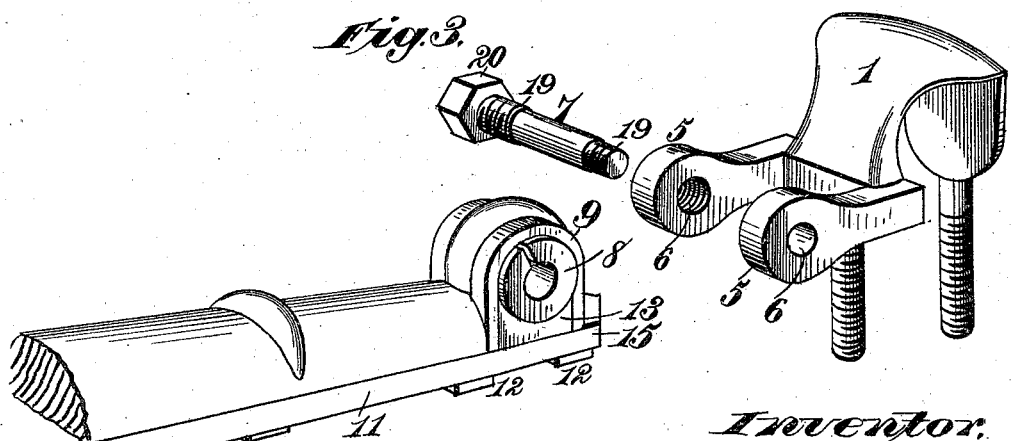
Witnesses,
Robert Everett.
W. H. Norris.
Inventor,
Henry Temple.
By James L. Norris.
Atty.

(No Model.) 2 Sheets—Sheet 2.

H. TEMPLE.
THILL COUPLING.

No. 305,642. Patented Sept. 23, 1884.

Witnesses,
Robert Everett,
A. H. Norris.

Inventor,
Henry Temple.
By James L. Norris,
Atty.

UNITED STATES PATENT OFFICE.

HENRY TEMPLE, OF GRAND RAPIDS, MICHIGAN.

THILL-COUPLING.

SPECIFICATION forming part of Letters Patent No. 305,642, dated September 23, 1884.

Application filed June 30, 1884. (No model.)

*To all whom it may concern:*

Be it known that I, HENRY TEMPLE, a citizen of the United States, residing at Grand Rapids, Michigan, have invented new and useful Improvements in Anti-Rattling Thill-Couplings, of which the following is a specification.

This invention relates to improvements in thill-couplings for carriages and other wheeled vehicles, and has for its object to provide novel means for connecting the thill-iron with the clip which embraces the axle, and to provide novel means for preventing rattling of the parts connecting the thill with the draft-bolt, and to generally improve the thill-connections.

The objects of my invention I accomplish in the manner and by the construction of devices hereinafter described and claimed, reference being had to the accompanying drawings, in which—

Figure 1 is a side elevation of a thill-coupling embodying my invention; Fig. 2, a horizontal sectional view taken on the line $x\ x$ of Fig. 1; Fig. 3, perspective views of the axle-clip and the thill detached, and Figs. 4, 5, and 6 side elevations of modifications of the invention.

In the drawings, the number 1 indicates the clip embracing the axle, and confined thereon by a bottom plate, 2, and nuts 3, engaging its threaded pendent extensions, as usual. The forward arm of the clip is constructed with two horizontal ears, 5, having perforations 6 in their outer extremities for the reception of the draft-bolt 7, which is surrounded between the ears with a packing-tube, 8, of rawhide or other suitable yielding material, to provide a tight joint, the ends of the tube preferably abutting the perforated extremities of the ears. A yoke, 9, embraces the packing-tube 8, and is provided with depending screw-threaded extensions 10, passing through orifices in the thill-iron 11 and confined rigidly on the said iron by screw-nuts 12. A block, 13, of metal or other material, is arranged between the arms of the yoke 9 under the packing, and is provided with a concave upper bearing-surface conforming to the cylindrical surface of the tube, the bearing-block being adjustable toward or from the packing-tube by an adjusting-screw, 14, engaging a threaded orifice in the rearward extension, 15, of the thill-iron, for the purpose of tightening or loosening the jointed connection by increasing or diminishing the pressure of the bearing-block on the packing-tube within the yoke. The packing-tube is of sufficient thickness to bear against the inner surfaces of the yoke-arms, and as the yoke rigidly connects with the thill-iron, it partakes of the swinging movements of the thill and turns the packing-tube on the draft-bolt; but the packing-tube might remain stationary if sufficiently clamped on the draft-bolt, so that the yoke would turn on the surface of the tube. The draft-bolt is cylindrical between the clip-ears, and is provided with right and left hand screw-threads 19, respectively, at its extremities, and with an angular head, 20, so that the screw-thread adjacent to such head can be screwed into threads in one of the clip-ears, the opposite end of the bolt engaging a screw-nut, 21, whereby the draft-bolt is securely retained in place and all liability of its working loose avoided.

Figure 5:
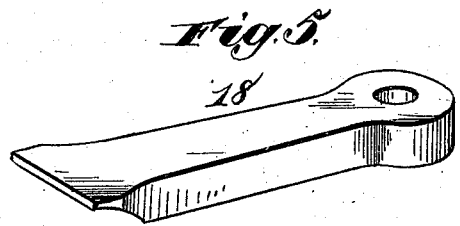
Figure 6:
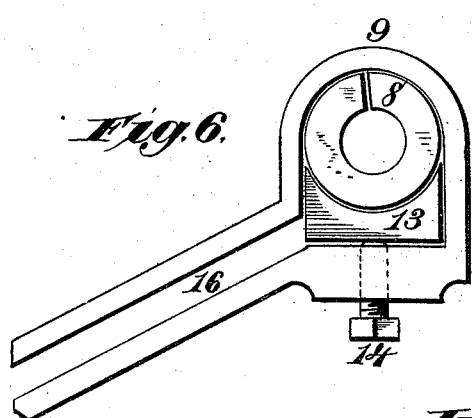

In Figs. 4 and 5 the construction of all the parts is the same as in Figs. 1, 2, and 3, with the exceptions that the lower extremities of the yoke-arms are extended forwardly, as at 16, to receive between them thill-iron 17, Fig. 4, or the thill-iron 18, Fig. 5. In Fig. 4 the thill-iron is secured by a bolt, pin, or otherwise between the forward extremities, and is provided with a socket to receive a tenon on the thill, which tenon may be screw-threaded to screw into the socket, while in Figs. 5 and 6 the thill-iron is held between the extensions 16 by a pin or rivet, and is bolted or riveted to the under side of the thill.

In the several constructions shown the essential features are common to all, in that the axle-clip 1 is provided with forwardly-extending perforated ears 5, carrying the draft-bolt 6; the yoke 9 embraces the packing-tube 8 on the draft-bolt between the clip-ears 5; the thill-iron is rigidly connected with the yoke-arms, and the bearing-block 13 is confined between the yoke-arms and the clip-ears to prevent its displacement, and is adjustable by an adjusting-screw to tighten or loosen the jointed connection.

The invention provides a durable and noiseless coupling in which the parts are not liable to become disarranged, and is useful and desirable in operation.

Having thus described my invention, what I claim is—

1. The combination of an axle-clip having ears, a draft-bolt supported in the ears, a packing on the bolt, a yoke hung on the packing between the clip-ears and having its yoke-arms adapted to rigidly connect with and partake of the swinging movements of a thill-iron, and an adjustable bearing-block supported in and moving with the yoke, substantially as described.

2. The combination of an axle-clip having ears, a draft-bolt supported in the ears, a packing on the bolt, a yoke hung on the packing between the clip-arms and having its yoke-arms adapted to connect with and partake of the swinging movements of a thill-iron, a bearing-block between the yoke-arms and clip-ears, and an adjusting-screw for moving the block in the yoke, substantially as described.

3. The combination of the axle-clip having perforated ears, the bolt having right and left screw-threads and a cylindrical body, the yoke around the bolt between the ears, having its yoke-arms adapted to be rigidly secured to partake of the swinging movements of the thill-iron, a bearing-block guided and held between the yoke-arms, and an adjusting-screw for moving the block, substantially as described.

In testimony whereof I have affixed my signature in presence of two witnesses.

HENRY TEMPLE.

Witnesses:
 FRED C. TEMPLE,
 CORNELIUS L. HARVEY.